Dec. 15, 1970  C. J. MUSER ET AL  3,547,599
SOLID STATE JOINING METHOD
Filed April 27, 1967
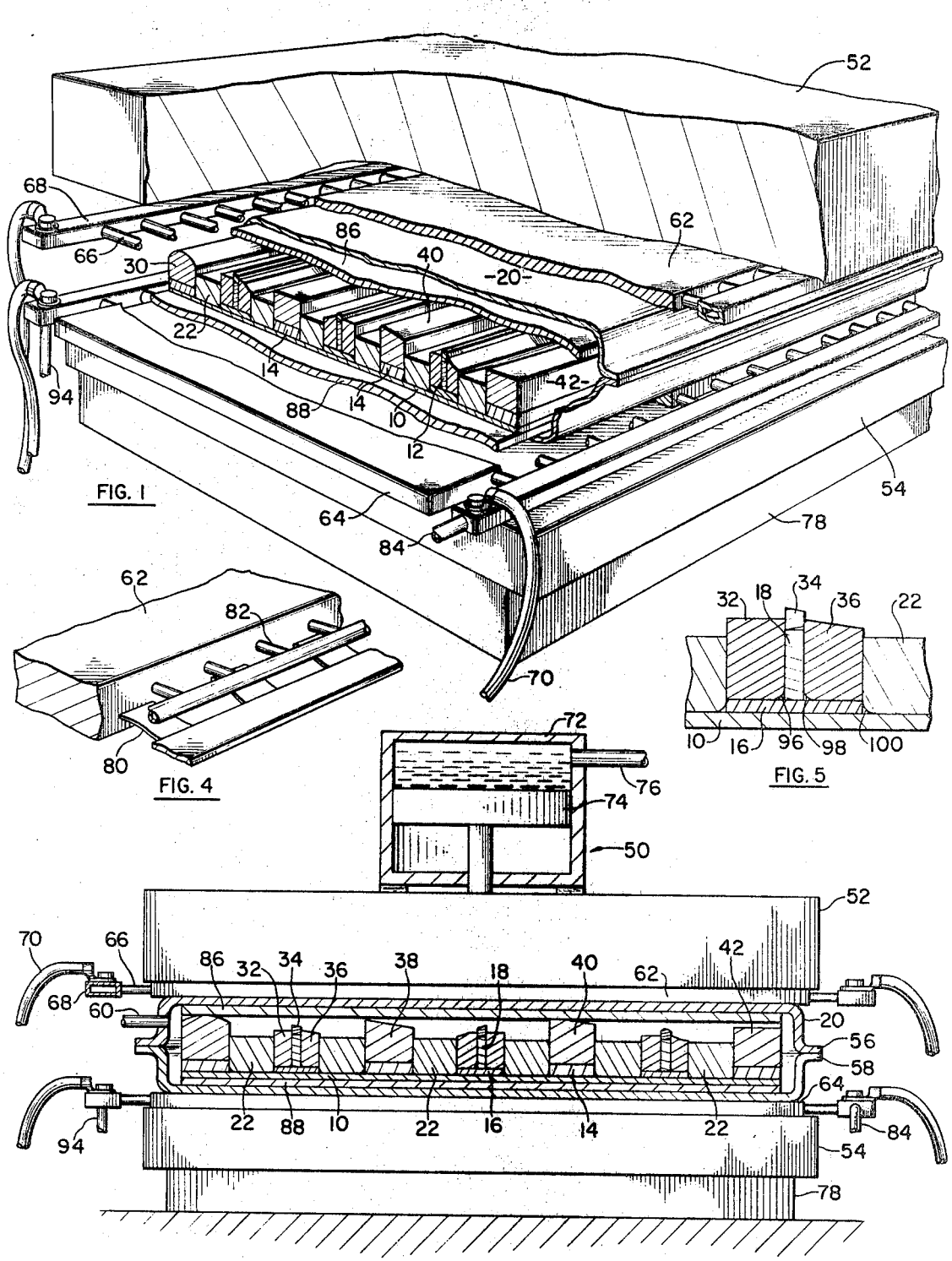
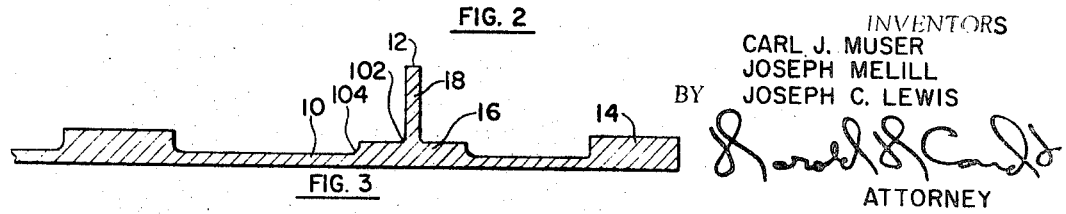
INVENTORS
CARL J. MUSER
JOSEPH MELILL
JOSEPH C. LEWIS
BY
ATTORNEY United States Patent Office 3,547,599
Patented Dec. 15, 1970

3,547,599
SOLID STATE JOINING METHOD
Carl J. Muser and Joseph Melill, Rolling Hills Estates, and Joseph C. Lewis, Pasadena, Calif., assignors to North American Rockwell Corporation, a corporation of Delaware
Filed Apr. 27, 1967, Ser. No. 634,209
Int. Cl. B23k 5/22, 31/02
U.S. Cl. 29—491                               11 Claims

ABSTRACT OF THE DISCLOSURE

Filler metal strips having high creep-deformation rate characteristics are contained within a retort to transmit compressive force to workpiece components for solid-state diffussion bonding in a press. The filler metal pieces deform under high pressure until all filler pieces are of equal height, whereby uniform pressure distribution is accomplished over the total area of the workpiece.

BACKGROUND

In processes known to the prior art for solid-state bonding of separate elements to form a single unitary mass therefrom, very high temperatures and pressures are required for the most commonly used workpiece materials. The amount of time, temperature and pressure required to achieve a diffusion bonded joint may be varied over a certain range, depending upon the particular workpiece materials involved. The range of temperatures and pressures, regardless of workpiece materials selected, is uniformly of a high order. Moreover, extremely clean and precisely matching contours are required for the surfaces to be joined, and isolation from gaseous or other contaminates is usually required at elevated temperature to prevent corrosion of workpiece surfaces such as would result from atmospheric contact therewith.

The foregoing conditions for solid-state diffusion bonding are normally achieved only by use of heavy autoclaves which essentially comprise massive thick-walled chambers within which the workpiece components are heated in an inert gas or vacuum or compressed together. The pressurizing of an autoclave imposes extreme forces thereon, while the necessary high temperatures simultaneously weaken the same highly stressed components of the apparatus, with the result that autoclaves are very heavy, severely limited as to size, and always costly. Moreover, since pressures in excess of 10,000 p.s.i. are beyond the capability of autoclaves, longer bonding cycles are required at lower pressures with the result that such devices are poorly suited for mass production and totally unsuited for use with large workpieces. The usable diameter of autoclaves currently used in industry is generally on the order of ten or twelve inches maximum.

SUMMARY OF INVENTION

According to an illustrative embodiment of this invention, a substantially flat plate 10 has a plurality of upstanding ribs 12 and pads 14 joined thereto by molecular diffusion bonding as shown in FIG. 3. Ribs 12 comprise base portions 16 and upstanding portions 18 which are joined to each other at the same time that rib assemblies 12 and pads 14 become joined to plate 10. Application of heat and pressure to accomplish the stated joints is by platens 52 and 54 operatively related to a conventional heavy press of any suitable type known to the prior art, in conjunction with heated platens 62 and 64 which bear against the outer surfaces of a retort 20 within which the workpiece elements are contained. Due to the necessity for subjecting every workpiece element to a particular selected temperature and pressure to effect a diffusion bond thereof, the different heights of the pads and rib assemblies require force-transmitting means in the form of mandrels or filler bars for transmitting the total pressure from platens 52 and 54 to each and every workpiece component over the entire area of the workpiece where diffusion bonding is sought to be accomplished. In order to achieve the necessary uniformity of pressure distribution without precision machining all the filler elements to insure uniformity in their shape and height, the filler bars illustratively comprising tooling elements 30, 32, 34, 36, 38, 40 and 42 possess high creep-deformation rate characteristics at the diffusion bonding temperature and pressure necessary to join the workpiece components 10, 12, 14, 16 and 18. A reference plane of low creep rate material comprising solid planar plate 86 is included within retort 20 and makes complete contact with the upper retort surface and transmits the total load from the press platens to the workpiece components through the mentioned tooling elements. The high creep rate filler material deforms under pressure until the reference plane comprising plate 86 is brought into contact with the lower areas of the tooling elements, after which uniform pressure throughout all the areas of the workpiece where diffusion bonding is desired ultimately results.

BRIEF DESCRIPTION OF DRAWINGS

FIG. 1 shows a general perspective and fragmented view of a tooling and workpiece layup within a press adapted to accomplish the novel method disclosed herein, FIG. 2 shows a cross-sectional view through the apparatus and workpiece assembly shown in FIG. 1, FIG. 3 shows a cross-sectional view through a completed workpiece resulting from use of the apparatus and method disclosed herein, FIG. 4 is an isolated fragmentary view of an alternative arrangement for a detail of the structure shown in FIGS. 1 and 2, and FIG. 5 is an enlarged cross-sectional view of a detail from FIG. 2.

DETAILED DESCRIPTION OF INVENTION

A major advantage of the inventive concept disclosed herein is the drastic reduction of time required to make a diffusion bond. Another major advantage is the considerable saving in equipment costs, particularly by avoiding the need for expensive autoclaves. Another advantage of the invention in this case is adaptability of the novel method to large workpieces, as well as workpieces of vastly different configuration and size without any change in the apparatus, instead of requiring a plurality of different apparatus size as identified in the use of autoclaves. Another advantage is the ability of the novel method and apparatus in this case to achieve strong, reliable diffusion bonded joints at a plurality of spaced-apart locations on a workpiece having a relatively large area.

Referring to FIG. 3 in the drawings, it may be seen that a workpiece fabricated according to the novel teachings set forth herein may illustratively comprise a plate 10 of any size from several inches to several yards in width, and having other workpiece elements or portions joined thereto at spaced-apart locations such as upstanding rib assemblies 12 and pads 14. Rib assemblies 12 further comprise base portions 16 and upstanding portions 18 which are arranged in desired final relationship contacting each other and workpiece portion 10 within a steel retort 20 as shown in FIGS. 1 and 2. A plurality of spacer bars 22 within retort 20 separates each of the workpiece elements to be joined to plate 10 from the remaining elements by one or more of the spacers. In addition to the spacer bars, each of the workpiece elements to be joined to plate 10 further has one or more force-transmitting tooling elements situated thereon in such a manner as to transmit compressive force externally applied to retort 20 to the workpiece elements sought to be joined. The mentioned force-transmitting filler tooling elements illustratively comprise mandrels 30, 32, 34, 36, 38, 40 and 42, and are adapted to apply substantially an identical amount of pressure between all of the contacting surfaces of workpiece elements 10, 12 and 14 which are intended to be joined by solid-state diffusion bonding. The required force to achieve solid-state joints between desired portions of the workpiece assembly is applied by a conventional press such as familiar to the prior art and generally designated by reference numeral 50 in FIG. 2. Thus, force is transmitted from press platens 52 and 54 to workpiece components 10, 12 and 14 through a force path described in greater detail below.

Where the workpiece components are of the same material and metallurgical composition, it will be understood that the same parameters of time, temperature and pressure required for solid-state diffusion bonding of such material must be achieved at each and every workpiece location where diffusion bonding is intended to occur. Mass distribution of heat and control of the time period are not severe difficulties in the usual case, but the uniform pressure distribution requirement is a particularly sensitive and heretofore onerous problem. Following initial placement of the workpiece components, spacer and force-transmitting filler materials within retort 20, the retort is welded closed by application of welding heat simultaneously to adjoining peripheral flanges 56 and 58 on the upper and lower halves of the retort, respectively, to join the same. The retort then is evacuated of all atmosphere through a vacuum line 60, after which the retort may be filled with an inert gas such as argon, at a pressure which preferably is less than atmospheric pressure.

The entire retort and its contents are thereafter preferably heated in a furnace for a sufficient period to insure that all the mentioned elements are at the same elevated temperature uniformly throughout their mass. After the foregoing initial heating step, retort 20 is removed from the furnace and placed between press platens 52 and 54. Because platens 52 and 54 are usually massive and unheated, a considerable amount of heat will be lost from retort 20 by conduction into the platens, resulting in undesirable or uncontrolled cooling of the retort and its contents in the absence of preventive measures to maintain the retort temperature at a substantially constant level during the bonding process after the furnace heating step. Such measures, as seen from FIGS. 1 and 2, preferably comprise a pair of heating platens 62 and 64 consisting of flat plate of high strength ceramic material or graphite with parallel planar surfaces. Resistance heating elements of rod, tubular or ribbon form are imbedded within each of the plates and preferably near the surface thereof which contacts retort 20. In addition, heating platens 62 and 64 may be thermally insulated from platens 52 and 54 by appropriate means such as by a sheet of asbestos or other material (not shown) having low heat transfer characteristics. Preferably, hollow tubes 66 of high electrical resistance metal or alloy are imbedded in platens 62 and 64 for heating or cooling the platens and retort 20 together with its contents. Suitable bus bars 68 or similar electrical connections are provided for elements 66 as shown in FIGS. 1 and 2, and have cable connections 70 operatively related to a power source (not shown). Bus bars 68 also act as hollow manifolds for a fluid coolant medium such as argon gas, so that coolant may be flowed through the bar 68 and thence through all the tubes 66 during the retort cooling step after bonding is completed. Prior to removal of retort 20 and its contents from the heating furnace, press 50 and related apparatus may be prepared to receive the heated retort by application of electrical power to high resistance heating elements 66 to preheat platens 62 and 64 so that a minimum of heat loss will occur when retort 20 contacts the same, and no heat from retort 20 will be conducted into massive platens 52 or 54.

With retort 20 and its contents situated between the platens of press 50 in the relationship shown by FIGS. 1 and 2, pressure is applied by the press in any convenient manner, such as schematically shown by fluid motor 72 in FIG. 2 containing piston 74 and adapted to apply downward force to movable platen 52 when fluid pressure is applied within the cylinder through conduit 76. Platen 54 of press 50 may be stationary as suggested by supporting structure 78 in FIG. 2. The pressure thus applied to retort 20 and its contents will normally be that amount required to deform the workpiece materials very slightly, that is, slightly above the yield strength of the workpiece material, although it will be understood that actual deformation of the workpiece materials is substantially prevented by the confining influence of filler elements 24 and 30–42. The mentioned predetermined amount of pressure, which will depend upon the workpiece material strength properties, is maintained for a predetermined length of time while the retort and its contents are maintained at the temperature required for diffusion bonding of the workpiece materials. After the mentioned predetermined period of time has elapsed, application of electrical power to elements 66 is terminated, and the same elements may be used to cool platens 62 and 64 and retort 20 together with its contents by forcing a coolant such as argon gas through the same elements. Alternatively, if the heating elements are high resistance metallic strips or ribbons, such as strips 80 in FIG. 4, cooling tubes 82 identical to conduits 66 may be imbedded in platens 62 and 64 parallel to such ribbons and alternately spaced therewith as shown in FIG. 4 to cool the platens and retort by fluid coolant flow from a manifold in the same manner described above with regard to tubes 66 and hollow bar 68. The retort and its contents are cooled uniformly to room temperature after the bonding cycle has been completed, and the mentioned parts are maintained under compressive force from press 50 during the cooling step in order to maintain the desired shape of the workpiece by avoiding distortion due to temperature stresses within the part. After the foregoing steps are completed, retort 20 is opened by cutting through flanges 56 and 58 to permit removal of its contents whereby the finished workpiece illustratively shown by FIG. 3 is obtained.

With particular regard to FIG. 2, it may be seen that application of pressure uniformly throughout the entire area of workpiece components 10, 12 and 14 where bonding is desired would require the height of each force-transmitting element such as bars 22, 30, 32, 34, 36, 38, 40 and 42 to be precisely the same. This would rquire precision machining of each individual filter tooling element to insure uniformity in their shape and height. Due to the impracticability and especially the time and expense required in precision machining operations on a mass production basis, it is of particular significance in the concept disclosed herein, that force-transmitting tooling bars 30–42, for example, are made from materials having relatively high creep-deformation rate characteristics at the diffusion bonding temperature and pressures used for forming the workpiece shown in FIG. 3. Thus, a stable reference plane of relatively low creep rate deforming material is established by solid planar plate 86 contained within retort 20 overlying the workpiece and filler materials, while plate 88 corresponds with plate 86 but underlies the mentioned workpiece and filler components. Due to discrepancies and non-uniformity in the shape, height and contour of the mentioned force-transmitting tooling elements, it will be understood that only the highest such element or elements will be initially contacted by reference plate 86, such as elements 30 and 40 when downward force is initially applied to retort 20 by press 50. If the total amount of such force is 100,000 pounds, then this entire amount of force will be applied to elements 30 and 40 shown in FIG. 2, amounting to a total load of 50,000 pounds on each of the stated elements. Since the material in elements 30 and 40 is particularly selected so that these elements will deform under loads of this magnitude, such deformation will gradually result in lateral or other displacement of the material therein until elements 30 and 40 are of a height corresponding with the next lowest tooling elements in the retort, such as elements 34, 36 and 38, for example. As these next lower tooling elements are contacted by reference plate 86, they too will absorb some of the total 100,000-pound load and will deform until finally the lowest of all the force-transmitting tooling elements within retort 20 is contacted and thereby assumes its share of the total load. As each of the force-transmitting elements is deformed and therefore reduced in height, it will be understood that a total compressive load applied by press 50 is shared by more and more of the elements until all finally have an equal stress and the force distribution of such applied load will be uniform throughout the entire area of the workpiece in those portions where diffusion bonding is intended to occur.

When the reference plane comprising the lower surface of plate 86 makes contact with the lower areas of the force-transmitting tooling elements, the pressure on the higher areas is reduced and deformation of the material in all the force-transmitting elements correspondingly decreases. The high creep rate material over all the contacted areas then deforms at a slower predetermined rate and pressure is uniformly applied to all areas of the workpiece where diffusion bonding occurs. The predetermined deformation rate of the material in the force-transmitting tooling elements must be low enough to allow completion of the bonding cycle before total deformation of the high creep rate material takes place, because contact of plate 86 with substantially non-deforming spacer members 22 would tend to cause non-uniform and unpredictable pressure distribution over the total workpiece area.

The inventive concept discussed herein has been practiced with consumate success using such materials as titanium, iron and low carbon steels as high creep rate materials in the force-transmitting tooling elements, and using such materials as stainless steel, nickel and cobalt base alloys, and refractory metals as low creep rate materials in plates 86 and 88. For example, a workpiece generally corresponding with that shown in FIG. 3 but having a plan view area of about 6" x 10" was successfully manufactured from precipitation hardenable stainless steel known as PH 5-7 Mo using the method and apparatus disclosed herein wherein the low creep rate material used in plates 86 and 88 was SAE 321 stainless steel, and the high creep rate material in the force-transmitting tooling elements was SAE 1030 steel.

The retort and its contents were initially heated in a furnace for a sufficient period to achieve a temperature of 1700° F. substantially uniformly throughout the masses of workpiece and tooling elements. Thereafter, the report was held in the press between heated platens and maintained at substantially the stated temperature for sixteen hours under a continuous compression load of about 1500 p.s.i., being about 90,000 pounds total compressive force. As noted hereinabove, this amount of force is intentionally more than the yield strength of the workpiece material at the bonding temperature. Although deformation of the workpiece materials is substantially prevented by the confining influence of the spacers and other tooling elements within the retort, it is a significant feature of the inventive concept in this case that the ooling elements are adapted to permit limited deformation of the workpiece material under the mentioned compressive force in order to form fillets at the locations indicated by reference numerals 102 and 104 in FIG. 3.

Thus, it may be seen from FIG. 5 that tooling elements 32, 36 and 22 have rounded edges 96, 98 and 100, respectively, resulting in elongate gaps or voids into which workpiece material may flow during application of bonding force. The workpiece material thus deformed will assume a contour and size corresponding with the surface contours of rounded edges 96, 98 and 100 and will become joined to the adjacent workpiece surfaces by solid-state diffusion at the same time that the other workpiece materials are joined. Thus, fillet 102 is integrally formed between workpiece portions 16 and 18, while fillet 104 is integrally formed between workpiece portions 16 and 10.

It will be understood by those skilled in the art that the time required to achieve a complete solid-state joint in a particular workpiece material will depend upon co-ordinated time-temperature-pressure values embraced within a certain range. Thus, at higher pressure, less time is usually required to effect a completed joint than when a lower pressure value is used, the temperature remaining unchanged. Where platens 52 and 54 are made from materials having sufficiently low thermally conductive properties so that a complete diffusion bonded joint may be achieved at tremendous compressive forces by press 50, it could happen that initial preheating of retort 20 and its contents in a furnace followed by immediate application of such tremendous compressive force could conceivably produce a solid-state joint in the workpiece components before the cooling effects of platens 52 and 54 had lowered the temperature of the workpiece below that at which solid-state bonding might occur. In such event, it will be understood that heated platens 62 and 64 could be omitted. Moreover, if the walls of retort 20 are sufficiently massive, of uniform thickness throughout, substantially planar, and of relatively low creep deformation rate material, then the upper and lower walls of the retort could conceivably serve the function of plates 86 and 88, thus permitting omission of one or both such plates.

Among the metals or alloys which may be joined by solid-state diffusion bonding are aluminum, stainless steel, titanium, nickel, tantalum, molybdenum, zirconium and columbium. Diffusion bonding is characterized by inter-molecular exchange between contacting surfaces of the workpiece at suitable pressures and at temperatures below the melting point of the workpiece material. In some cases, a thin interleaf material, or eutectic former, is provided while in other forms of solid-state bonding no interleaf material is required. In general, plastic deformation of the workpiece material during the bonding step is advantageous but not essential where formation of fillets is not desired, because plastic deformation usually will accelerate the bonding process. The prior art involving solid-state or inter-molecular diffusion bonding includes issued U.S. Pats. 3,145,466; 3,180,022; 3,044,160; 2,850,798; and 3,170,234. The precise values of time, temperature and pressure utilized in connection with bonding of workpiece materials is not a critical or limiting feature of the broad concept disclosed herein, but specific materials with which the concept is usable are stated for illustration only. Thus, for example, if workpiece 10 is of titanium, solid-state bonding thereof may be achieved under coordinated time-temperature-pressure conditions of from about 3½ to 4½ hours, from about 1500–1700° F., and from about 250–800 p.s.i. compressive force. Where large workpieces are sought to be diffusion bonded, total forces on the order of 500 tons would be required, and would be completely unfeasible using autoclaves of the types known to the prior art.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:

1. A method of forming fillets in a solid-state diffusion bonded joint between at least two components of a workpiece, comprising:

providing at least one mandrel in contacting relationship with said workpiece components, said mandrel having a rounded edge portion thereon forming an elongate spatial gap proximate the desired location of said fillet, said gap having a size and shape generally corresponding to the size and shape desired for said fillet, and applying sufficient heat and continuous static pressure for a period of time to bond said workpiece components together and simultaneously to deform the material in at least one of said components by sufficient pressure to flow said material into said gap.

2. The method set forth in claim 1 above, wherein:

said mandrel is of high creep-deformation rate material and arranged to transmit said pressure from the substantially planar surface of a press platen to said workpiece components where said components are bonded together.

3. A method of uniting together the component parts of a metallic workpiece by solid-state diffusion bonding therebetween over a limited area portion of one surface of one of said parts, comprising:

arranging said parts with a surface of one of said parts in contact with said limited surface area portion of another of said parts and with both said parts in close confinement within an air-tight retort, heating said parts to an elevated temperature sufficient to unite permanently together said parts by inter-molecular diffusion of the material in each said portion with the other at a predetermined amount of compressive force in said contacting portions, placing said retort and parts between two platens mounted in a press, and applying said compressive force to said retort by said platens and uniformly distributing said force over said contacting surface portions for a predetermined period of time sufficient to insure complete diffusion of material in said contacting portions.

4. The method set forth in claim 3 above, further including:

continuously maintaining compressive force on said retort between said platens while said parts are cooled from said elevated temperature to substantially room temperature.

5. The method set forth in claim 3 above, wherein:

said heating is accomplished by placing said retort and parts in a furnace, and said platens are heated in an amount sufficient to maintain said elevated temperature of said parts substantially constant during application of said force.

6. The method set forth in claim 5 above, wherein:

said platens are heated by a plurality of elongate electrically resistive metallic members embedded therewithin.

7. The method set forth in claim 3 above, further including:

continuously maintaining said force at a substantially constant amount while said parts are cooled from said elevated temperature to substantially room temperature, and said heating is accomplished by placing said retort and parts in a furnace, said platens are heated in an amount sufficient to maintain said elevated temperature of said parts substantially constant during application of said force, said platens including a plurality of elongate electrically resistive hollow tubular members embedded therewithin, and said cooling is accomplished by flowing cooling fluid through said hollow members after the termination of said heating.

8. The method set forth in claim 3 above, including in addition thereto:

filling said retort with an inert gas and sealing said retort with said parts contained therein and with an internal pressure less than atmospheric pressure before placing said retort between said platens.

9. A method of forming a solid-state bonded joint between contacting portions of separate workpiece components arranged within a retort to form a single unitary mass from said components, said method comprising:

placing said workpiece components and filler elements within said retort so that continuous compressive force externally applied to said retort will be transmitted to said workpiece portions through at least one of said filler elements, said one filler element having high creep deformation rate characteristics relative to said workpiece material, heating said workpiece elements within said retort to a predetermined elevated temperature sufficient to produce said solid-state bonding at a predetermined pressure, and applying static compressive force to said one filler element through said retort in an amount and a time period sufficient to deform said one filler element and to effect solid-state bonding of said workpiece components at said elevated temperature so that said deformation uniformly distributes said force completely over said workpiece portions and continuously thereafter to produce said solid-state bonded joint.

10. The method set forth in claim 9 above, including in addition thereto:

during the step of preplacing said workpiece components and filler elements in said retort, the step of preplacing a solid member having a substantially planar surface in contact with said one filler element and in force-transmitting relationship therewith, said member having low creep deformation rate characteristics relative to said one filler element at said elevated temperature and pressure.

11. A process for joining together at least two workpiece components by solid-state bonding of the material therein, comprising:

placing said components in mutually contacting relationship at a plurality of spaced-apart locations within an air-tight envelope, providing a plurality of force-transmitting tooling elements in contact with said components within said envelope and arranged to transmit compressive force to said workpiece components at said locations through said tooling elements, said tooling elements comprising material capable of gradually deforming at a high creep rate relative to said workpiece material at the temperature and pressure during bonding, evacuating said envelope of atmospheric content, heating said envelope and its contents to an elevated temperature, less than the melting point of said workpiece material, placing said envelope in a press, applying a predetermined amount of pressure to said components at said temperature with a compressive force from said press through said tooling elements to gradually deform said tooling elements at a high creep rate relative to said workpiece material, and maintaining said pressure and said temperature for a predetermined period of time sufficient to produce a solid-state diffusion joint between said components.

References Cited

UNITED STATES PATENTS

| | | | |
|---|---|---|---|
| 3,110,961 | 11/1963 | Melill et al. | 29—494X |
| 3,112,389 | 11/1963 | Wiant | 219—85 |
| 3,186,083 | 6/1965 | Wright, Jr. | 29—494 |
| 3,235,312 | 2/1966 | Hollander | 29—470.3X |
| 3,273,233 | 9/1966 | Oberle et al. | 29—470.3X |
| 3,323,203 | 6/1967 | Hollander et al. | 29—470.3 |
| 3,350,078 | 10/1967 | Shultz et al. | 219—85X |
| 3,044,160 | 7/1962 | Jaffee | 29—498X |

OTHER REFERENCES

Albom, M. J.: "Solid State Bonding," Welding Journal, June 1964, pp. 491-504.

Garrett, B. R., et al.: "Broad Applications of Diffusion Bonding," National Aeronautics and Space Administration Contractor Report, NASA-CR-409, particularly pp. 82, 117, and 122.

NASA Contractor Report, NASA-CR-409, Broad Applications of Diffusion Bonding by Garrett et al., pp. 82, 117 and 122, March 1966.

JOHN F. CAMPBELL, Primary Examiner

R. J. SHORE, Assistant Examiner

U.S. Cl. X.R.

29—494, 498